United States Patent
Brodersen et al.

(12)

(10) Patent No.: US 6,732,100 B1
(45) Date of Patent: May 4, 2004

(54) DATABASE ACCESS METHOD AND SYSTEM FOR USER ROLE DEFINED ACCESS

(75) Inventors: Karen Brodersen, Redwood City, CA (US); Thomas M. Rothwein, San Jose, CA (US); Matthew S. Malden, San Francisco, CA (US); Mingte J. Chen, Fremont, CA (US); Anil Annadata, Milpitas, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/540,299

(22) Filed: Mar. 31, 2000

(51) Int. Cl.$^7$ ................................. G06F 17/30
(52) U.S. Cl. .................. 707/9; 707/2; 707/5; 707/6; 713/182; 713/183
(58) Field of Search ............... 707/8, 9, 10, 1, 707/2, 3, 4, 5, 6; 713/182, 183, 185, 186

(56) References Cited

U.S. PATENT DOCUMENTS

| | | | | |
|---|---|---|---|---|
| 5,335,346 A | * | 8/1994 | Fabbio | 707/9 |
| 5,778,357 A | | 7/1998 | Kolton et al. | |
| 5,941,947 A | * | 8/1999 | Brown et al. | 709/225 |
| 6,085,191 A | | 7/2000 | Fisher et al. | |
| 6,253,203 B1 | * | 6/2001 | O'Flaherty et al. | 707/9 |
| 6,275,825 B1 | * | 8/2001 | Kobayashi et al. | 707/9 |
| 6,349,294 B1 | * | 2/2002 | Shaath et al. | 707/2 |
| 6,499,059 B1 | * | 12/2002 | Banzhaf | 707/10 |

* cited by examiner

*Primary Examiner*—Kim Vu
*Assistant Examiner*—Isaac Woo
(74) *Attorney, Agent, or Firm*—James W. Soong; Perkins Coie LLP

(57) ABSTRACT

Method and system for determination and granting of access to data and files by the file or database creator, owner or manager or by group or user access profiles. The database is partitionable among data owners, and access is awarded based upon the requestor's organizational attributes.

53 Claims, 1 Drawing Sheet

| SALES REP | DIVISION | PROFIT CNTR | CUSTOMER | SALES IN 2000 |
|---|---|---|---|---|
| Patterson 21 | MICROELECT 21A | CHIPS | | |
| | MICROELECT 21B | CARDS | | |
| Hennessey 23 | SERVER 23A | RISC 6000 | | |
| Streetman 25 | SERVER 23B | AS400 | | |
| Sze 27 | SERVER 27A | ENT 9000 | | |

| SALES REP | DIVISION | PROFIT CNTR | CUSTOMER | SALES IN 2000 |
|---|---|---|---|---|
| Patterson 21 | MICROELECT 21A | CHIPS | | |
| | MICROELECT 21B | CARDS | | |
| Hennessey 23 | SERVER 23A | RISC 6000 | | |
| Streetman 25 | SERVER 23B | AS400 | | |
| Sze 27 | SERVER 27A | ENT 9000 | | |

FIGURE 1

| BANK | CUSTOMER | ACCOUNT # | TRANSACTION 1 | TRANSACTION 2 | TRANSACTION 3 |
|---|---|---|---|---|---|
| CITI 43 | McCabe 43A | 4567-1234-5678 | ---------- | ---------- | ---------- |
| | *Smith 43B* | 4567-1243-6587 | ---------- | ---------- | ---------- |
| MBNA 45 | VanNess 45A | 4210-5678-9111 | ---------- | ---------- | ---------- |
| | *Bird 45B* | 4210-6294-6611 | ---------- | ---------- | ---------- |
| BANKONE 47 | Stewart 47A | 4816-1776-1812 | ---------- | ---------- | ---------- |
| | *Lightfoot 47B* | 4816-2558-1149 | ---------- | ---------- | ---------- |

FIGURE 2

DATABASE ACCESS METHOD AND SYSTEM FOR USER ROLE DEFINED ACCESS

FIELD OF THE INVENTION

The invention relates to determination and granting of access to data and files by the file or database creator, owner or manager or by group or user access profiles.

BACKGROUND

Current database management applications and especially the access subsystems thereof support what could be called a "Single Organization Model". This means that all users of a system, even though they may work in various divisions of a company or various channels of a marketing organization, or even different entities leasing portions of the same database through a common vendor or service organization, are deemed to ultimately work for the same organization, and that organization is at the root of the organizational hierarchy.

Present access control mechanisms, built on the "Single Organization Model," are cumbersome when applied to multi-divisional or multi-channel organizations or to multi-tenant databases.

This is because present access authorization systems are adapted to: (1) partition data to show users only those records that they or their position have been granted visibility to, and (2) show users all "global" data in a particular dataset. However, absent cumbersome "work arounds" present access authorization subsystems do not have the ability to partition data at the organizational or channel level. This makes it impossible, for instance, for companies using the "e-channel marketing" paradigm that do business in multiple countries in Europe to maintain separate price lists for each country and have only those price lists that are appropriate for a region or country be accessible. This cumbersome access control also makes it difficult for multiple small financial service organizations to outsource database and telephone support operations to a common vendor while preserving customer confidentiality.

SUMMARY

The invention is a database management system and a method of using the system. The system has an access control subsystem, and is characterized by a plurality of user entries representing users seeking access to data items, where each of the user entries has at least one organizational access attribute. The data stored in the underlying database has a plurality of data items. Each of the data items may be a data file, a data field within a data file, or a view of a data items. Selected ones of the data items have at least one organizational access attribute. This organization attribute is used by the access control subsystem. The access control subsystem receives a database query from a user requesting access to one or more of the data items. The access control subsystem reads the user's organizational access attributes, and reads the data item's organizational access attributes. The access control subsystem then presents data items to the user to which the user has access authorization.

In one embodiment of the invention, particularly useful in channel marketing and in multi-divisional enterprises, the database files have a plurality of fields, and the users have personal, positional, and organizational attributes, and are divisible into multiple membership sets based upon organizational attributes. The database views are visible to users based upon the personal, positional, and organizational attributes of the users.

The data files and fields may extend across organizations, or they may be disjoint, extending to only one organization. Likewise, the users may be in overlapping organizations, or in only one organization.

According to this embodiment of the invention, the views visible to a user are determined by the user's organizational and positional attributes, and the view files are determined by a user's organizational and/or positional attributes. In a still further embodiment, the view files are determined by a user's organizational attributes, and view fields are determined by a user's positional attributes.

In an alternative embodiment of the invention a plurality of organizations exclusively own individual data files in the database management system. An individual data file has a single owner. The access control subsystem is configured to authorize a customer of the owner organization to have access to their own data items and to grant access to their own data items to an additional user, for example, a telephone service representative, while the customer accesses the data items. The customer can authorize the additional user to access and update the data item.

In this embodiment, the database system may be regarded as a partitionable database with a plurality of separate virtual databases. Each of the separate virtual databases may have a unique database owner, and a user can only access files in a virtual database to which the user has access authorization from the database owner.

The separate virtual databases may be disjoint, for example with common ownership or separate and unique owners. Access may depend upon authorization from the database owner to access either the database or a file within the database, and where the user requesting access is not the owner of the file, access may require authorization from the owner of the file. This situation typically occurs in a multi-tenant database having a plurality of tenants, where each tenant is the owner of a separate virtual database, and at least two of the tenants utilize a common call center service, as is the case with a large financial institution servicing the customer accounts of other financial institutions.

THE FIGURES

The method and system of the invention are illustrated in the FIGURES.

FIG. 1 represents a simplified, high level view of the schema of a database of the "multi-organization support" method and system of the invention.

FIG. 2 represents a simplified, high level view of the schema of a database of the "multi-tenancy support" method and system of the invention.

OVERVIEW

This invention relates to database access and more particularly to methods and systems for controlling database access through an access authorization subsystem of the database management system. The access authorization subsystem utilizes user and data attributes that have utility beyond database access or visibility; the access authorization subsystem filtering, screening, and querying these attributes to determine access or visibility of a user to a data item. The ability to dynamically support database access based upon the instantaneous role of the user at the time of access, that is, in real time, requires a user role defined access authorization subsystem such as the "Multiple Organization Model," having a schema as shown at a very high level in FIG. 1, or "Multi-Tenant Model," having a schema as shown at a very high level in FIG. 2.

The concept of the "multiple organization model" or "multi-organizational" support is especially important to e-channel marketing. The driving force behind e-channel marketing is that multiple channel partners share a common database, including business objects and tools, with the main company. Each of the channel partners should only see data that is relevant to their own organization. This means that they would not see data for other channel partners or non-global data from the parent organization.

Similarly, the concept of the "Multi-Tenant Model" or "Multi-Tenant Support" is especially important to small financial service providers, retailers, and the like. This is because multi-tenant support enables these businesses to out source, for example, their credit card operations to a service agency or large financial services organization, with the telephone support staff member of the large financial services organization having real time access to the individual account being serviced during the service call.

DETAILED DESCRIPTION

This invention relates to database access where a user's access rights to specific data items are defined dynamically, that is, in real time, based upon the user's status at the time of access request, and data and user attributes having independent utility and significance apart from access and visibility. Colloquially, the user has one set of access authorizations while wearing a red hat and another set of access authorizations while wearing a blue hat. The hats could represent roles as a telephone service representative for multiple credit card issuers sharing a multi-tenant, vendored, database, or roles as a marketing representative of a company in first and second regions.

The database access system and method of the invention utilizes a division of the data "owners" either (1) hierarchically, that is vertically, with horizontal divisions in branches, or (2) horizontally, that is, separate virtual databases. The database itself is divided into files, the files are divided into records within the files, and individual records are divided into fields. In either mode of division, (hierarchically or horizontally) the schema and metadata data needed would be sophisticated, and user access is based upon user's relationship to one or more owners in the hierarchy. (For example, owners could be independent lessees of database capacity or divisions in a multi-divisional enterprise).

The method and system of the invention builds upon partitionability of the individual database files in the database based upon an attribute of ownership and/or control. For example, in the multi-tenancy model, the database might be partitionable into separate and distinct individual virtual databases, as in the case of financial services organizations, for example competing financial services organizations, vendoring database capacity, database management services, and telephone support services for a service provider. By way of contrast, in the multi-organization support model, the database's parent organizational owner is hierarchically and organizationally divisible, for example into divisions, departments, and offices, where each branch point may be a hierarchical level and each branch may be a functional owner of a portion of the enterprise database.

In both embodiments user access is triggered by a "need to know" or "convenient to know." In the multi-tenancy embodiment, the access is typically triggered by an incoming call to a vendored call center, and the view is based on the customer's computer telephony integration (CTI)-identified account number. Similarly, in the multi-organization support embodiment, the access is triggered by end user action, and the specific view is triggered by the end-user's logon, that is, which division or channel or reporting chain is used for this task.

Multi Organization Support

In a large organization where the same products and/or services are rendered through different employees and/or rendered to different customers, or where some goods, services, or customer sets are prohibited to some employees or organizations and permitted to others (for example, sale of encryption equipment or code to the PRC, or the sale with English only labeling/instructions in Quebec), and the product set is too large and/or unwieldy to maintain separate databases, there is a definite productivity advantage to organizationally limiting access so that the marketing representative is not inundated with "useless" information. This is accomplished by assigning access authorization organizationally, including regionally. This way, when a sales or service rep or a channel partner enters a "MYLIST" command, he or she is only presented with a virtual database of the products and/or services that he or she can actually render. This is the "single database—multiple independent users" embodiment, also referred to as the "multi-organization support" method and system.

FIG. 1 is a very high level view of the database schema of a "multi-organization support" model. The schema, 1, has, for purposes of illustration, five fields in each record. These fields are the Sales Rep, 11, the Division, 13, the Profit Center (within the Division, 13), 15, the customer 17, and the sales to that customer in the year 2000, 19. Sales Representative Patterson, 21, is in the Microelectronics Division 21A, 21B, and sells in two profit centers of the division, cards, and chips. Hennessey, 23 is in only one Division, the Server Division, 23A, and sells the goods of only one profit center, RISC 6000. Also in the Server Division, 25B, is Streetman, 25, who only sells the product of one profit center, the AS400 profit center. Sales Representative Sze, 27, is also in the Server Division, here 27A, and only sells the products of one profit center, the ENT 9000 profit center.

The multi-organization support utilizes new types of visibility attributes called "organization" and "organization team" visibility. In the multi-organization support method and system of the invention, the records that a user sees with "organization" and "organization team" visibility are restricted based upon the organization(s) that the user has been given visibility into, while the ones the end user sees with "position" and "position team" visibility are restricted based upon the user's current position. While there may be some overlap between "organization" attributes and "position" attributes, they may confer different rights. For example, "organization" attributes may only confer "read" authorization, while "position" attributes may confer "read," "write", and "delete" authorization. The "organization" and "organization team" visibility is used in a series of "My Organization's" views that show all of the data that the user's organization has been granted visibility to. In this way, multiple organizations can share the same database but see a partitioned set of data that is pertinent to them. It is also to be understood, that there may be inheritance of access up and down and across a hierarchy.

One access attribute specifies the visibility attributes of the higher level organization, for example a division. This means that the number of distinct organizational partitions will be relatively small compared to the overall number of divisions in the hierarchy. Also, organizational partitions should be relatively high in the hierarchy. Therefore, most of the lower level entities in a large enterprise, for example a domestic marketing division of a large international enterprise may reference the US division as their visibility organization. This would enable all people who work for any of those lower level product or marketing organizations to see the same partition of data.

The relationship between divisions and positions is normally a 1-to-many relationship, although the system and method of our invention can support a many-to-many relationship. That is, a position belongs to exactly one division. If a user needs to have access to data in multiple organizations, then the user would be required to have positions in the appropriate organizations, or, in an alternative embodiment of our invention, to have personal or positional access to the data separate and apart from but in addition to his or her organizational access to the data. This could be done by having positions specifically for granting visibility to users outside of the organization.

Single organization ownership is added to an entity by adding a foreign key to the owning organization and configuring the business component appropriately. Organization teams are added to an entity by adding an intersection table between that entity and organization and a foreign key to the primary owning organization, and configuring the business component appropriately.

During login, while the system is collecting information about the positions a user is associated with, the system looks at the user's division or divisions and collects the set of organizations those divisions have visibility into. If a user has n positions, that is, n positional attributes, the user will have between 1 and n organizations for visibility.

The organization and organization team visibility's are used for "My Organization's" views to show the user all of the records for the entity where the user's "current" organization is either the owner, or on the organization team. The user's "current" organization will be the visibility organization assigned to the division of the user's "current" position. When a user changes current position, the "current" organization will be changed automatically.

Channel Partners may be administered by creating a division node or hierarchy as the visibility organization in the appropriate table. All sub-organizations for that channel partner should specify the root channel partner division node as the visibility organization. Similarly, the Pick Lists and association lists for entities that are "multi-org'd" will show the appropriate organization specific data.

Channel partners may either assign access authorization to their own users or request the database owner to assign access authorization.

Multi Tenancy Support

An alternative embodiment of our invention is the "multiple tenancy" model described with respect to CTI applications. This embodiment solves problems associated with the situation of a plurality of merchants and/or financial services organization vendoring out their telephone service and data processing operations to a common vendor. The common vendor stores the merchants' and institutions' customer accounts in an access controlled database while also providing customer telephone support service for the customer accounts. That is, the CTI (computer-telephony integration) automatically switches the agent to the correct slice (that is, customer files) of the database. Access to a customer account is authorized in real time during the individual telephone support session with the customer. During the individual customer support session, the telephone support representative has access to the individual merchant's or financial institution's business objects, queries, and views, as well as those of the database service provider.

FIG. 2 shows a very high level view of the "multi-Tenant" database schema, 1. This schema shows three banks in the Bank column 31, CITI 43, MBNA, 45, and BankOne, 45. In the customer column, 33, each bank is shown with only two customers, McCabe 43A and Smith 43B for CITI, 43, Van Ness 45A and Bird, 45B for MBNA, 45, and Stewart, 47A, and Lightfoot, 47B, for BankOne 47. Each customer has an account number, shown in column 35, and space for the last three transactions, shown in columns 37, 39, and 41. In operation, if VanNess were to call the Vendor's support center on the appropriate access number, and properly enter the account number shown for VanNess in column 35, line 45, VanNess's account would come up on the CTI operator's screen, and both VanNess and the CTI operator would have access to account information.

To be noted is that when a caller calls in to an outsourcing call center or multi-tenancy call center, they get switched to the slice of the database for that tenant (for example, the slice of the database assigned to their financial service provider) not just the particular file for that particular caller or customer. This is important because in this way the customer can access information about Products, Price Lists, Service Requests and Services of the tenant of interest that is being provided by the tenant, either directly or through outsourcing.

While the invention has been described with respect to certain preferred embodiments and exemplifications, it is not intended to limit the scope of the invention thereby, but solely by the claims appended hereto.

We claim:

1. A database management system that controls access to stored data items of an organization based on a hierarchical structure of the organization, the hierarchical structure of the organization including multiple hierarchical organization levels that each include multiple hierarchical organization branches at that hierarchical organization level, each of the hierarchical organization branches deriving its own access attributes from the hierarchical organization level with which it is associated, the database management system comprising:

a plurality of user entries representing users seeking access to data items, each of the user entries having multiple associated organizational access attributes that are hierarchically configured to represent the organization in such a manner that each organizational access attribute corresponds to one of the hierarchical organization branches at one of the hierarchical organization levels of the organization; and an access control subsystem that is configured to repeatedly use the associated organizational access attributes of users to manage access to data items of the organization, the data items each associated with multiple of the organizational access attributes, the managing of the data item access by:

receiving a database query from a user requesting one or more data items;

reading the multiple organizational access attributes associated with the user;

reading the multiple organizational access attributes associated with each of the requested data items;

for each of the requested data items, determining based on the organizational access attributes of the user and of the data item whether to grant the user access to the data item by comparing the hierarchical organization levels for those organizational access attributes and by comparing the hierarchical organization branches for those organizational access attributes; and presenting to the user the data items to which the user is determined to have access.

2. The database management system of claim 1 in which the determining of whether to grant access to the user includes determining whether the user's organizational access attributes and the data item's organizational access attributes include a match.

3. The database management system of claim 1 wherein a plurality of organizations exclusively own individual data files in a database associated with the database management system, such that each of the individual data files has a single organization owner.

4. The database management system of claim 1 wherein said hierarchical levels correspond to ranges of organizations, and to data items identified thereto.

5. The database management system of claim 4 wherein the data items identified thereto are chosen from the group consisting of data fields, data files, and views.

6. The database management system of claim 1 wherein said hierarchical branches correspond to virtual or real organizations and data items identified thereto.

7. The database management system of claim 6 wherein the data items identified thereto are chosen from the group consisting of data files and views.

8. The database management system of claim 1 wherein hierarchical levels correspond to access to data fields and data views, and hierarchical branches correspond to access to data files and data views.

9. The database management system of claim 1 wherein each of the data items is a data file, a data field within a data file, or a view of data items.

10. The database management system of claim 1 wherein each of the data items is stored in one or more databases associated with the database management system.

11. The database management system of claim 1 wherein two of the hierarchical organization levels correspond to divisions and departments within the organization.

12. The database management system of claim 1 wherein each of the hierarchical organization branches are functional owners of the data items that have an organizational access attribute corresponding to that hierarchical organization branch.

13. A method of managing access to data items in a database for an organization, the organization having a structure that includes multiple hierarchical organization levels that each include multiple hierarchical organization branches, the method comprising:

for each of multiple user entries associated with the database, associating multiple organizational access attributes with the user entry, the organizational access attributes each corresponding to one of the hierarchical organization branches at one of the hierarchical organization levels of the organization;

for each of multiple data items of the database, associating at least one of the organizational access attributes with the data item; and after the associating of the organizational access attributes with the user entries and with the data items, using the associated organizational access attributes to manage access to the data items, by receiving a database query from a user requesting one or more data items that each have one or more associated organizational access attributes;

determining the multiple organizational access attributes associated with the user;

determining the organizational access attributes associated with the requested data items;

determining whether to grant the user access to the requested data items by comparing the hierarchical organization branches corresponding to the organizational access attributes of the user and of the data items and/or by comparing the hierarchical organization levels of those hierarchical organization branches; and providing to the user the data items to which the user is determined to have access.

14. The method of claim 13 wherein the determining of whether to grant access to the user includes determining if the user's organizational access attributes and the data item's organizational access attributes include a match.

15. The method of claim 13 wherein a plurality of organizations exclusively own individual data files in the database such that individual data file each have a single owner.

16. The method of claim 15 wherein a customer of an owner organization has access to a data item, and further comprising granting by the customer to an additional user access to the data item while the customer is accessing the data item.

17. The method of claim 16 further comprising the customer accessing the data item and thereafter authorizing the additional user to access and update the data item.

18. The method of claim 13 wherein said hierarchical levels correspond to ranges of organizations, and to data items identified thereto.

19. The method of claim 18 wherein the data items identified thereto are chosen from the group consisting of data fields, data files, and views.

20. The method of claim 13 wherein said hierarchical branches correspond to virtual or real organizations and data items identified thereto.

21. The method of claim 20 wherein the data items identified thereto are chosen from the group consisting of data files and views.

22. The method of claim 13 wherein hierarchical levels correspond to access to data fields and data views, and hierarchical branches correspond to access to data files and data views.

23. The method of claim 13 wherein each of the data items is a data file, a data field within a data file, or a view of data items.

24. The method of claim 13 wherein two of the hierarchical organization levels correspond to divisions and departments within the organization.

25. The method of claim 13 wherein each of the hierarchical organization branches are functional owners of the data items that have an organizational access attribute corresponding to that hierarchical organization branch.

26. A computer-readable medium whose contents cause a computing device to manage access to data items in a database for an organization, the organization having a hierarchical structure that includes multiple organization levels and multiple hierarchical organization branches, the managing of the access to the data items by performing a method comprising:

for each of multiple user entries associated with the database, associating multiple organizational access attributes with the user entry, the organizational access attributes each corresponding to one of the hierarchical organization branches and one of the organization levels of the hierarchical organization;

for each of multiple data items of the database, associating at least one of the organizational access attributes with the data item; and after the associating of the organizational access attributes with the user entries and with the data items, using the associated organizational access attributes to manage access to the data items, by receiving a database query from a user requesting one or more data items that each have one or more associated organizational access attributes;

determining the multiple organizational access attributes associated with the user;

determining the organizational access attributes associated with the requested data items;

determining whether to grant the user access to the requested data items by comparing the hierarchical organization branches corresponding to the organizational access attributes of the user and of the data items and/or by comparing the organization levels corresponding to the organizational access attributes of the user and of the data items; and providing to the user access to the data items to which the user is determined to have access.

27. The computer-readable medium of claim 26 wherein the determining of whether to grant access to the user includes determining if the user's organizational access attributes and the data item's organizational access attributes include a match.

28. The computer-readable medium of claim 26 wherein the method includes, after providing access to a data item to a user, granting access to the data item to an additional user while the user is accessing the data item.

29. The computer-readable medium of claim 26 wherein the organization levels correspond to ranges of organizations.

30. The computer-readable medium of claim 26 wherein the organization branches correspond to virtual organizations.

31. The computer-readable medium of claim 26 wherein the organization branches correspond to real organizations.

32. The computer-readable medium of claim 26 wherein each of the data items is a data file, a data field within a data file, or a view of data items.

33. The computer-readable medium of claim 22 wherein organization levels correspond to access to the data fields, and wherein organization branches correspond to access to the data files.

34. The computer-readable medium of claim 26 wherein two of the organization levels correspond to divisions and departments within the organization.

35. The computer-readable medium of claim 26 wherein each of the hierarchical organization branches are functional owners of the data items that have an organizational access attribute corresponding to that hierarchical organization branch.

36. The computer-readable medium of claim 26 wherein the user has multiple distinct roles within the organization that each have a distinct set of organizational access attributes, and wherein the determining of the multiple organizational access attributes associated with the user includes determining a current one of the multiple roles for the user and selecting at least some of the organizational access attributes from the set for the determined current role.

37. The computer-readable medium of claim 36 wherein the method includes, after the user is provided access to one or more of the data items based on the organizational access attributes for the determined current role of the user, temporarily granting access to at least some of those data items to another user based on an indication received from the user.

38. The computer-readable medium of claim 36 wherein the method includes receiving multiple queries from the user while the user is acting in different roles, such that the current role determined for the user for at least one of the received queries is different from the current role determined for the user for at least one of the other received queries.

39. The computer-readable medium of claim 38 wherein two of the received queries from the user for which different roles are determined relate to a single data item, and wherein the user is granted access to the single data item for one of the two received queries based on the role of the user determined for that query and is denied access to the single data item for the other of the two received queries based on the different role of the user determined for that query.

40. The computer-readable medium of claim 36 wherein the method includes, before the receiving of the query from the user, associating with the user the multiple distinct roles for the user.

41. The computer-readable medium of claim 36 wherein the method includes, before the receiving of the query from the user, associating the sets of organizational access attributes for the roles with those roles.

42. The computer-readable medium of claim 36 wherein the multiple roles for the user are mutually exclusive such that the user has only one current role at a time.

43. The computer-readable medium of claim 36 wherein the roles represent types of activities that the user performs for the organization.

44. The computer-readable medium of claim 36 wherein the database is shared by multiple related organizations that are part of a shared channel in such a manner that different of the organizations have different access authorizations for at least some of the data items.

45. The computer-readable medium of claim 26 wherein the method further includes identifying a combination of information about the user that includes information specific to the user, information based on one or more defined groups of people within the organization to which the user belongs, and information related to one or more positions that the user holds within the organization, and wherein the determining of whether to grant the user access to the requested data items is further based at least in part on the identified combination of information.

46. The computer-readable medium of claim 45 wherein the groups of people within the organization to which the user belongs include one or more organizational sub-structures within the organization.

47. The computer-readable medium of claim 45 wherein the groups of people to which the user belongs and/or the one or more positions that the user holds within the organization are identified based on one or more of the organizational access attributes associated with the user.

48. The computer-readable medium of claim 45 wherein the determining of whether to grant the user access to the requested data items based on the identified combination of information includes comparing the combination of information to additional retrieved information that indicates access controls for the data items.

49. The computer-readable medium of claim 26 wherein the computer-readable medium is a memory of a computing device.

50. The computer-readable medium of claim 26 wherein the contents are instructions that when executed cause the computing device to perform the method.

51. A computing system that manages access to stored data items of an organization based on a hierarchical structure of the organization, the hierarchical structure of the organization including multiple hierarchical organization branches that each have multiple organization levels, the computing system comprising:
- a plurality of stored entries for users of the organization that each have multiple associated organizational access attributes, the organizational access attributes each corresponding to one of the hierarchical organization branches and one of the organization levels of the organization;
- a plurality of stored data items for the organization that each have at least one associated organizational access attribute; and
- an access control subsystem that is configured to determine whether to grant a user access to one or more data items that each have one or more associated organizational access attributes by determining the organizational access attributes associated with the user and the organizational access attributes associated with the data items and by comparing the hierarchical organization branches' corresponding to the organizational access attributes of the user and of the data items and/or comparing the organization levels corresponding to the organizational access attributes of the user and of the data items, and that is configured to provide to the user access to the data items when the user is determined to have access to the data items.

52. The computing system of claim 51 wherein the user has multiple distinct roles within the organization that each have a distinct set of organizational access attributes, and wherein the determining of the organizational access attributes associated with the user includes determining a current one of the multiple roles for the user and selecting multiple of the organizational access attributes from the set for the determined current role.

53. The computing system of claim 51 wherein the access control subsystem is further configured to identify a combination of information about the user that includes information specific to the user, information based on one or more defined groups of people within the organization to which the user belongs, and information related to one or more positions that the user holds within the organization, and wherein the determining of whether to grant the user access to the requested data items is further based at least in part on the identified combination of information.

* * * * *